US006185522B1

(12) United States Patent
Bakker

(10) Patent No.: US 6,185,522 B1
(45) **Date of Patent: *Feb. 6, 2001**

(54) METHOD AND SYSTEM FOR EMULATING MICROCONTROLLERS

(75) Inventor: Jacobus M. Bakker, Eindhoven (NL)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/080,836

(22) Filed: May 18, 1998

(30) Foreign Application Priority Data

May 30, 1997 (EP) ................................................ 97201616

(51) Int. Cl.[7] ...................................................... G06F 9/455

(52) U.S. Cl. ............................... 703/28; 712/227; 714/28

(58) Field of Search ......................... 395/500.45, 500.46; 703/25, 28, 23; 710/3, 4; 712/211, 227; 714/28, 39

(56) References Cited

U.S. PATENT DOCUMENTS 4,315,308 * 2/1982 Jackson ................................. 701/33
4,939,637 * 7/1990 Pawloski ......................... 395/500.47
5,313,618 * 5/1994 Pawloski ......................... 395/500.49
5,345,580 * 9/1994 Tamaru et al. ......................... 703/28
5,426,769 * 6/1995 Pawloski ................................. 710/2
5,566,344 * 10/1996 Hall et al. ............................. 712/37
5,574,852 * 11/1996 Bakker et al. ................. 395/500.44
5,574,894 * 11/1996 Iles et al. ............................ 713/500
5,790,833 * 8/1998 Gulick et al. .................. 395/500.49

OTHER PUBLICATIONS

PCT search report, PCT/IB98/00536.*

* cited by examiner

*Primary Examiner*—Kevin J. Teska
*Assistant Examiner*—Kyle J. Choi
(74) *Attorney, Agent, or Firm*—Brian J. Wieghaus

(57) ABSTRACT

A method for emulating a non-bond-out version of a microcontroller that has a standard port, a microcontroller allowing such emulating, and a system for executing the emulation. For emulating a non-bond-out version of a microcontroller, a standard port is used to multiplex among user data and program store addresses. An external register is connected to the port for latching therein program store addresses. The microcontroller is synchronized according to a machine cycle that has a plurality of states, each of which comprises at least two clock pulses. The standard port is used for outputting mutually exclusive parts of a program store address in contiguous sections of a machine state of external parallel evaluation.

9 Claims, 2 Drawing Sheets

METHOD AND SYSTEM FOR EMULATING MICROCONTROLLERS

BACKGROUND OF THE INVENTION

The invention relates to a method for emulating a non-bond-out version of a microcontroller that has standard port, such as disclosed in U.S. Pat. No. 5,574,852 assigned to the same assignee as in this application, which patent is hereby incorporated by reference. At present, the in-circuit emulation of many microcontrollers, such as, but not being limited, to use with the well-known 80C51 microcontroller, requires the presence of at least two 8-bit IO-ports. One port, usually port P0, is then used as a multiplexed 8 bit low address/data bus, whereas the another one, normally port P2, provides the high bits of the 16 bit address space. Since both of these ports therewith will have lost their standard IO-facility, this IO facility must be reconstructed externally from the chip. The data that is necessary for the P0, P2 reconstruction is then supplied in multiplexed fashion via the P0, P2 lines. This needs to be done only in emulation mode, because in normal mode the port lines operate in a manner that has been defined specifically for the microcontroller in question. Further, restricting the operation to 8-bit memory addresses would be out of the question. For many microcontroller applications that need only limited IO, the cost of two ports has been found excessive.

SUMMARY TO THE INVENTION

In consequence, amongst other things, it is an object of the present invention to provide facilities to allow emulation of a microcontroller that has a program memory space which needs more address bits than according to the width of the parallel port.

The invention provides a method for emulating a microcontroller having an internal multiplexer and an IO port. According to an embodiment of the invention, the method comprises the steps of latching program latching program store addresses into the microcontroller via the IO port; multiplexing, using the internal multiplexer, user data and the program store addresses input to the microcontroller via the IO port; synchronizing the microcontroller according to a predefined machine cycle having a plurality of states, each of which comprises at least two clock pulses; and outputting, from the IO port, mutually exclusive parts of a program store address in a machine state of the machine cycle for external evaluation of the address.

The invention also relates to a microcontroller allowing such emulation, and to an emulation system arranged for executing the method according to the invention. Other objects and attainments together with a fuller understanding of the invention will become apparent and appreciated by referring to the following description and claims taken in conjunction with the accompanying drawings.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
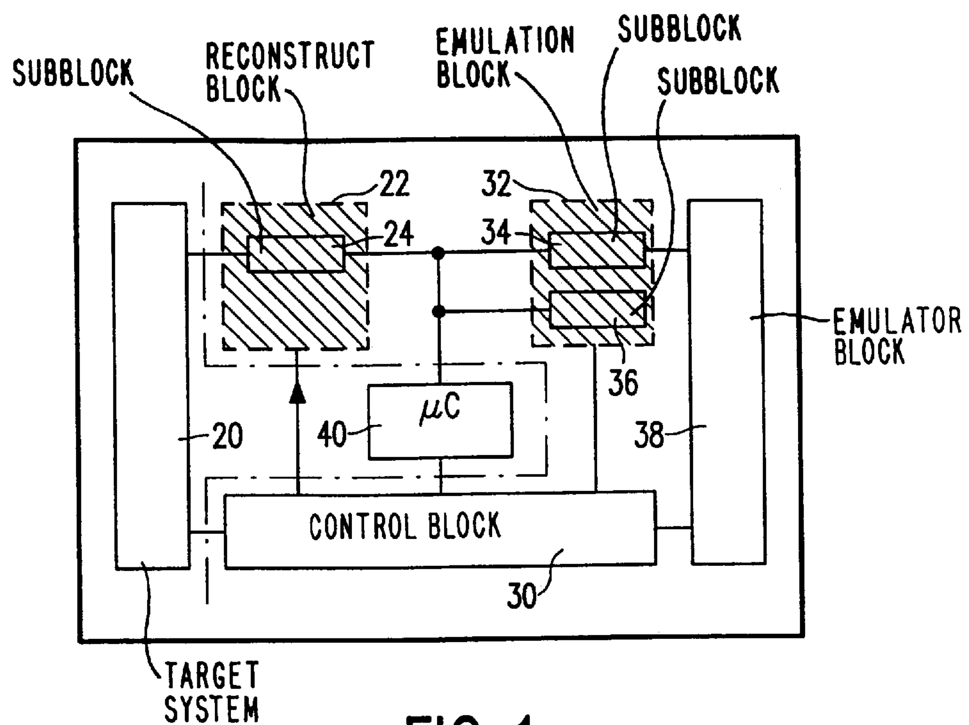
FIG. 1, a microcontroller emulation setup.

FIG. 1 is a generalized diagram of a so-called microcontroller probe. Block 20 represents the target system that is the object of the emulation process, and which has been designed to accommodate a standard copy of the microcontroller in question provided with an application or user program and which system furthermore comprises such hardware to fulfill the intended user function in cooperation with and/or under control from the application program. The object of the emulation is to check the correct functioning of the above program in cooperation with the hardware. By way of example, the target system may be a telephone handset provided with certain intelligent user functionality. Inasmuch as the present invention is not directed to improvement of the target system itself, no further explanation is given for reasons of brevity.

Next, blocks 22, 30, 32 are sub-systems of what is conventionally called an "emulator probe" and which interfaces the various partner devices in the emulation process. First, block 22 is the reconstruct block which provides access to those internal connections of the target system that its microcontroller should use. During emulation the specifically adapted microcontroller (or its derivative or an otherwise suitable controller) is in position as indicated by block 40, to execute the application program in lieu of the corresponding microcontroller that during normal use should form part of the target system but is absent therefrom during emulation. Now, in particular, block 22 reconstructs port P0 in subblock 24. The reconstruction is so, that the operation of microcontroller 40 remains undisturbed with respect to signal transfer in either direction.

In similar manner, emulation block 32 interfaces to a standard emulator system 38 that has address and data buses connected to block 32, which are derived from port P0, as indicated by blocks 34, 36, respectively. For reasons of brevity, block 38 is not detailed further. Emulation block 32 selects the information that emulator device 38 needs for addressing the emulation memory and for tracing the emulation microcontroller 40. It sends the instructions of the emulated program to microcontroller 40 and inserts the emulation break routines. On a level higher than the machine cycle of microcontroller 40, emulation is a standard art which is not being detailed further for reasons of brevity.

Control block 30 interfaces to reconstruct block 22, to emulation block 32, to emulation microcontroller 40, to target system 20 and to emulator block 38. It handles the adjustments needed in the control signals, and also handles the enable signals for various blocks. Moreover, after a reset operation it sets microcontroller 40 in microprocessor emulation mode. In the above, the interconnection shown is not on a wire by wire basis, but only symbolically. More information on the setup of the above may be derived from the emulation system disclosed in U.S. Pat. No. 5,574,852.

Figure 2:
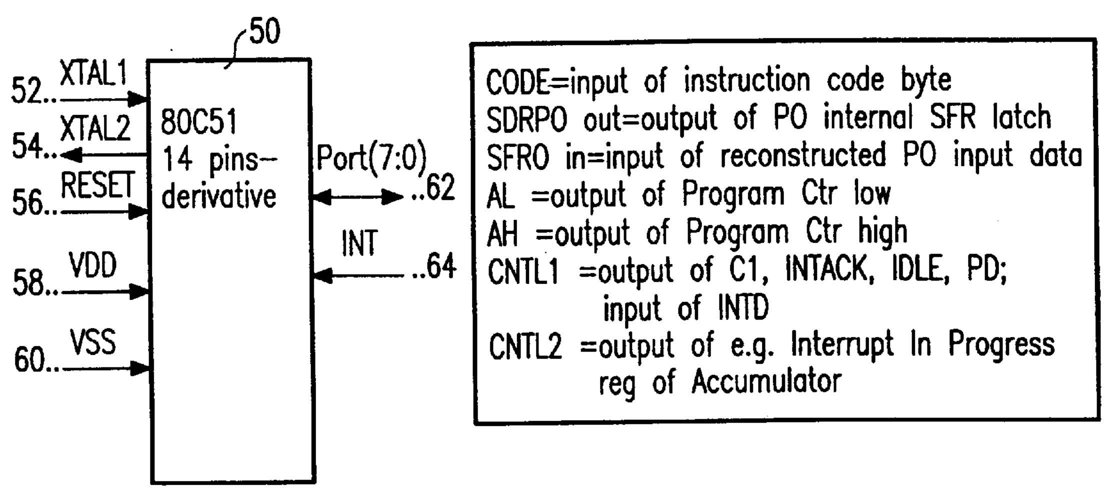
FIG. 2, a pin configuration of an exemplary microcontroller.

FIG. 2 is a pin configuration of an exemplary microcontroller 50, in particular one that has a low pin count. In the preferred embodiment of an 80C51 derivative, only 14 pins are present. In practice, the invention is in particular applicable to a microcontroller that has a relatively large program memory combined with only a single parallel port, possibly in addition only one or more serial ports. Nevertheless, in principle the invention might also be useful if two parallel ports are present. In general, the invention envisages to minimize the overall pin count. In the embodiment shown, item 52 is the first crystal pin and 54 the second crystal pin, which pins usually get a bridging clock crystal thereacross. Further, pin 56 is a RESET pin, 58 a VDD pin, 60 a VSS pin, 62 an 8-bit parallel port, and 64 an interrupt pin. The above in fact is a minimal configuration that may be enhanced with one or more further control and/or power pins; the number of control pins could then be three or four, and the skilled art practitioner would know how to choose an advantageous configuration if the overall pin count should be restricted to 16, 18, or 20 pins, taking into account an intended field of application, versatility level, and cost. The interfacing of a microcontroller like the one shown in FIG. 2 to external circuitry can be effected according to well-known principles, whilst taking into account the particularities of the present invention, that will become obvious from ascertaining the present patent application hereinafter and the general state of the art of emulation.

Since often at least 64 kBytes of read-only program memory are needed, a 16-bit address must be provided. According to previous technology, for low pin-count microcontrollers, in particular those that have only a single parallel IO port, an additional parallel port should then be added exclusively for emulation purposes. Moreover, often such microcontrollers are not able to signal the internal timing of the microcontroller: there is no Address Latch Enable ALE, no Program Store Enable PSEN, no state timing information, no OPCODE fetch signal, and no interrupt acknowledge output. In such case, the timing synchronization is usually based only on the external crystal clock XTAL in combination with a single synchronization instant via the RESET input. This may cause problems, in particular because newer IC technologies tend to have higher clock rates.

The following multiplexing scheme according to the invention for low pin count microcontrollers solves the above problems. It is based on outputting both the 16 bit address and the 8 bit code byte via a single 8 bit port; this new multiplexing scheme may also provide rigid timing and control information for the externally attached emulation system through using the same single port.

Figure 3:
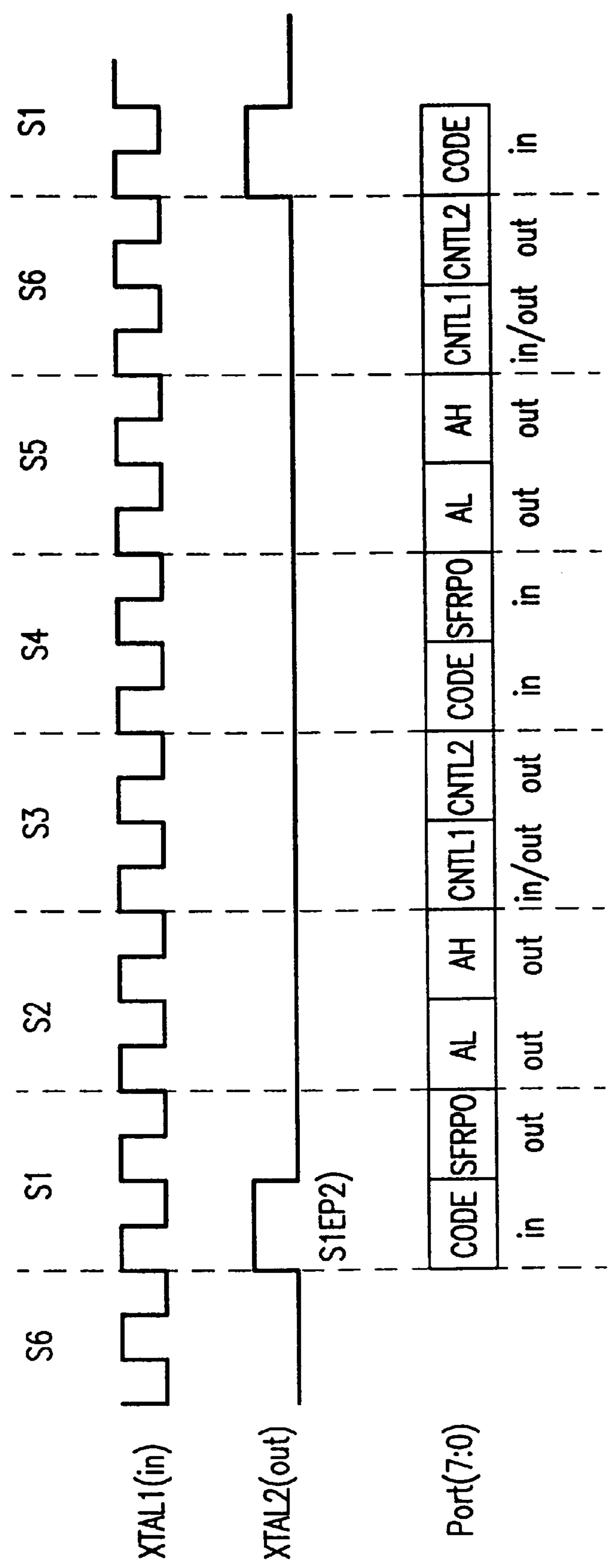
FIG. 3, a timing diagram for the emulation operation.

FIG. 3 is a timing diagram for the emulation multiplexing operation for low pin-count microcontrollers, such as have been described supra. In the Figure, CODE indicates the input of an instruction code byte, SFRP0 out indicates outputting of the content of the P0 internal SFR latch, SFRP0 in indicates inputting of the reconstructed P0 input data, AL indicates outputting of the lower half of the Program counter, AH indicates outputting of the upper half of the Program counter, CNTL1 indicates an interval for allowing the output of various signals Opcode Fetch C1, Interrupt Acknowledge INTACK, IDLE, Power Down PD, as well as the inputting of Interrupt Disable/Emulation Halt signal INTD, all of which signals getting their reserved pin in the port P0. CNTL2 indicates an interval for allowing the output of further signals or data, such as the content of an Interrupt in Progress Register or an Accumulator. Again, all of these signals get their reserved pin.

The microcontroller does not have external data memory, nor program memory access, and in consequence, no ALE, PSEN, RDN, or WRN pins are available. Initially, the microcontroller is set to emulation mode through applying a predetermined ten-bit control code to the reset pin. By itself, this way of applying a control code is known in the art. Now, in emulation mode, the input XTAL1 receives a clock input signal, instead of the free-running clock that is provided in normal operating conditions by the crystal that bridges XTAL1 and XTAL2. As a first measure according to the invention, the emulation mode provides an external synchronization output signal from pin XTAL2. This particular signal is active during the clock phase S1EP2, which in the embodiment of FIG. 3 occurs every twelfth clock period on XTAL1, and allows external reconstruction of all state-timing and also of all early state-timing signals.

Outputting of the Address Low via the port occurs during first clock of state S2 (indicated by AL). Outputting of the Address High via the port occurs during the second clock of state S2 (indicated by AH).

The inputting of the program memory code byte occurs during the first clock of state S4. Addressing of the next following byte occurs during S5 (first clock: AL output, second clock: AH output). Inputting of the addressed program memory byte is done in the first clock period of S1.

For external reconstruction of the port, the internal port latch information is output during the second clock of S1, indicated by SFRP0 out , the external port input data is read into the processor during second clock of S4, indicated by SFRP0 in.

The CNTL1 data in/out the processor is an 8 bit data word, through which the following control information is output to the external emulator logic during the first clock of S3 and S6. The bits of CNTL1 during this moment have the following meaning:

C1 output; one bit cycle 1 indication. Bit 0 is used for this. It is set to '1' by the processor when the next following code fetch is an opcode fetch Interrupt Acknowledge: Is set to '1' when the processor executes the internal CALL vector operation upon an interrupt. Bit 1 is used for this.

INTD in: INTD input. When activated by external hardware, the processor stops timers, watch dog timer, and also inhibits interrupts. Bit 2 is used for this.

IDLE output: Is set to '1' when the processor enters the IDLE power saving mode. Bit 3 is used for this.

Power down output: Is set to '1' when the processor enters the Power Down energy saving mode. Bit 4 is used for this.

The remaining 3 bits are free to be used for outputting any other (real-time) information out of the processor.

The CNTL2 data in/out moment is used to transfer important processor data. This may be e.g. the Interrupt in Progress register, but can be also another register e.g. the accumulator.

The described emulation multiplexing organization has the following advantages compared to current multiplexing schemes:

Uses only one 8 bit IO port instead of two IO ports

Program memory access time is about 2.5 clock period, which is between the so-called Standard Hooks and Enhanced Hooks emulation schemes access times. For non-emulation timing this is about three clocks Internal timing information is available at no pin cost Internal control information available at no pin cost Internal register information available at no pin cost.

Particular aspects are that this is again another multiplexing scheme, and that it requires fast external logic, because time slots are now only a single clock period each, instead of two successive clock periods.

What is claimed is:

1. A method for emulating a target microcontroller that is configured to execute program code that is stored in an internal program memory only, the target microcontroller having a data IO port that is configured to provide a transfer of user data to and from the target microcontroller, the method comprising the steps of:

providing an adapted microcontroller that is configured to execute the program code in lieu of the target microcontroller, the adapted microcontroller being substantially equivalent to the target microcontroller, including an IO port corresponding to the data IO port of the target microcontroller;

providing the program code to the adapted microcontroller from an external source; and synchronizing the adapted microcontroller according to a predefined machine cycle having a plurality of machine states;

wherein the adapted microcontroller is adapted to contain an internal multiplexer at the IO port that is configured to output a program address in a first machine state of the machine cycle for external evaluation of the program address, input program code corresponding to the program address during a subsequent machine state, and transfer the user data during an other machine state, thereby allowing an emulation of the target microcontroller without requiring additional signal access pins on the adapted microcontroller.

2. The method as claimed in claim 1, wherein the adapted microcontroller further includes a first and a second synchronizing crystal pin, and the method further comprising the steps of:

inputting, via the first synchronizing crystal pin of the microcontroller, a synchronizer drive input signal;

providing, via the second synchronizing crystal pin of the microcontroller, an external synchronization signal, thereby facilitating synchronizing the adapted microcontroller; and reconstructing externally to the adapted microcontroller all necessary state timing signals based on the synchronizer drive input signal and the external synchronization signal.

3. The method as claimed in claim 1, further comprising the step of communicating selective control signals to the adapted microcontroller via the IO port in an additional machine state of the machine cycle.

4. The method as claimed in claim 3, wherein the additional machine state at which the control signals are communicated is divided into a plurality of sections for communicating in each such section respective different control signals.

5. The method as claimed in claim 4, wherein at least one section of the additional machine state is used for one or more control signals in either direction.

6. The method as claimed in claim 1, wherein a like-formatted sub-cycle within each machine cycle is repeated at least twice, and wherein each such sub-cycle has a plurality of sections and two correspondingly positioned sections of respective sub-cycles within a particular cycle are used for transferring the user data in mutually opposite directions.

7. The method as claimed in claim 1, further comprising the step of reconstructing externally all necessary early state timing signals.

8. An emulation system for emulating a target microcontroller that is configured to execute program code that is stored in an internal program memory only, the target microcontroller having a data IO port that is configured to provide a transfer of user data to and from the target microcontroller comprising:

an adapted microcontroller that is configured to execute the program code in lieu of the target microcontroller, the adapted microcontroller being substantially equivalent to the target microcontroller, including an IO port that corresponds to the data IO port of the target microcontroller, and is adapted to contain an internal multiplexer at the IO port that is configured to output a program address in a first machine state of a plurality of machine states in a predefined machine cycle for external evaluation of the program address, input program code corresponding to the program address during a subsequent machine state, and transfer the user data during an other machine state, thereby allowing an emulation of the target microcontroller without requiring additional signal access pins on the adapted microcontroller;

an emulation device that is configured to receive the program address from the adapted microcontroller and to provide thereafter the program code corresponding to the program address; and means for synchronizing the adapted microcontroller according to the predefined machine cycle.

9. An emulation microcontroller for emulating a target microcontroller that is configured to execute program code that is stored in an internal program memory only, the target microcontroller having a data IO port that is configured to provide a transfer of user data to and from the target microcontroller, the emulation microcontroller being configured to execute external program code in lieu of the internal program code of the target microcontroller, the emulation microcontroller being substantially equivalent to the target microcontroller, the emulation microcontroller comprising:

an IO port corresponding to the data IO port of the target microcontroller; and an internal multiplexer at the IO port that is configured to output a program address in a first machine state of a plurality of machine states in a predefined machine cycle for external evaluation of the program address, input program code corresponding to the program address during a subsequent machine state, and transfer the user data during an other machine state;

thereby allowing an emulation of the target microcontroller without requiring additional signal access pins on the adapted microcontroller relative to the target microcontroller.

* * * * *